US012214996B2

(12) United States Patent
Fujiwara et al.

(10) Patent No.: US 12,214,996 B2
(45) Date of Patent: Feb. 4, 2025

(54) NOTIFICATION SYSTEM

(71) Applicant: KOBELCO CONSTRUCTION MACHINERY CO., LTD., Hiroshima (JP)

(72) Inventors: Yusuke Fujiwara, Hiroshima (JP); Seiji Saiki, Hiroshima (JP); Natsuki Yumoto, Hiroshima (JP)

(73) Assignee: KOBELCO CONSTRUCTION MACHINERY CO., LTD., Hiroshima (JP)

(*) Notice: Subject to any disclaimer, the term of this patent is extended or adjusted under 35 U.S.C. 154(b) by 381 days.

(21) Appl. No.: 17/758,895

(22) PCT Filed: Jan. 19, 2021

(86) PCT No.: PCT/JP2021/001642
§ 371 (c)(1),
(2) Date: Nov. 16, 2022

(87) PCT Pub. No.: WO2021/157336
PCT Pub. Date: Aug. 12, 2021

(65) Prior Publication Data

US 2023/0219791 A1 Jul. 13, 2023

(30) Foreign Application Priority Data

Feb. 3, 2020 (JP) ................................ 2020-015989

(51) Int. Cl.
*B66C 1/08* (2006.01)
*B66C 1/06* (2006.01)
(Continued)

(52) U.S. Cl.
CPC .................. *B66C 1/08* (2013.01); *B66C 1/06* (2013.01); *H01F 7/18* (2013.01); *B66C 15/065* (2013.01); *G08B 7/06* (2013.01)

(58) Field of Classification Search
CPC .... B66C 1/00; B66C 1/06; B66C 1/08; B66C 13/16; B66C 13/40; H02P 9/00;
(Continued)

(56) References Cited

U.S. PATENT DOCUMENTS 5,619,312 A * 4/1997 Hatano .............. G03G 15/0856 399/61
5,998,944 A * 12/1999 Clutter ...................... B66C 1/08 318/158

(Continued)

FOREIGN PATENT DOCUMENTS

CN 2561756 Y 7/2003
JP 52-97550 8/1977

(Continued)

OTHER PUBLICATIONS

International Search Report issued in PCT/JP2021/001642, filed on Jan. 19, 2021, 2 pages.

*Primary Examiner* — Van T Trieu
(74) *Attorney, Agent, or Firm* — Oblon, McClelland, Maier & Neustadt, L.L.P.

(57) ABSTRACT

A notification system includes: a notifier which notifies an operator of a state of a lifting magnet; a sensor which detects at least one of a voltage, an electric current, and an electric power supplied for exciting the lifting magnet; a determination part which determines, based on detection data from the sensor, whether an attraction quantity of the lifting magnet reaches a maximum attraction quantity after excitation of the lifting magnet is started; and a notification control part which causes the notifier to notify that the attraction quantity reaches the maximum attraction quantity when the determination part determines that the attraction quantity reaches the maximum attraction quantity.

7 Claims, 6 Drawing Sheets

(51) Int. Cl.
*H01F 7/18* (2006.01)
*B66C 15/06* (2006.01)
*G08B 7/06* (2006.01)

(58) Field of Classification Search
CPC .. H02P 9/10; H01H 7/18; H01H 47/00; H01F 7/18; H01F 7/1811; G03G 15/00; G03G 15/0822; G03G 15/0856; G03G 15/0893; G08B 7/06
See application file for complete search history.

(56) References Cited

U.S. PATENT DOCUMENTS

| | | | | |
|---|---|---|---|---|
| 2009/0161284 | A1* | 6/2009 | Maraval | B66C 1/08 361/144 |
| 2021/0163267 | A1* | 6/2021 | Yuzawa | B66C 13/16 |

FOREIGN PATENT DOCUMENTS

| | | | |
|---|---|---|---|
| JP | 2011-68422 | A | 4/2011 |
| JP | 2014-55061 | A | 3/2014 |
| JP | 2018-144938 | A | 9/2018 |

* cited by examiner

ON
ATTRACTION SWITCH SIGNAL
OFF
EXCITATION
EXCESSIVE EXCITATION
DEGAUSSING

VOLTAGE (V)
MAGNET VOLTAGE
0
REVERSE EXCITATION

MAIN CIRCUIT VOLTAGE
TARGET VOLTAGE

POWERING MOTIVE POWER (W)
MAGNET ELECTRIC POWER
REGENERATION
MOTIVE POWER

NOTIFICATION SYSTEM

TECHNICAL FIELD

The present invention relates to a notification system which notifies a state of a lifting magnet attached to a magnet working machine and having an attraction quantity changing in accordance with an electric supply.

BACKGROUND ART

A magnet working machine has been known in the form of a hydraulic excavator including a lifting magnet, in place of a bucket, attached to a distal end of an arm thereof for performing works, such as attraction of load like iron scrappers, and selection, conveyance, and loading of the load. For instance, Patent Literature 1 discloses a magnet working machine for obtaining a horizontal position of a lifting magnet from an angle and a length of an arm, obtaining a maximum attraction quantity of the lifting magnet corresponding to the obtained horizontal position, and controlling an electric current supplied to the lifting magnet so that the lifting magnet attracts and holds the load at the maximum attraction quantity. The magnet working machine is aimed at preventing the magnet working machine from overturning under the control of the electric current for decreasing the maximum attraction quantity as the horizontal position is away from a machine main body. Besides, the magnet working machine adopts a countermeasure of encouraging a stop of an operation of moving the lifting magnet away from the machine main body farther than a predetermined position by issuing a warning sound when this operation is performed in a certain work.

In such a magnet working machine, excitation of the lifting magnet is started in response to an input of an attraction instruction by an operator when the attraction work is started. It takes some time until the attraction quantity of the lifting magnet reaches the maximum attraction quantity. The lifting magnet can attract load even before the attraction quantity thereof reaches the maximum attraction quantity. However, starting a conveyance work of conveying the load attracted before the attraction quantity reaches the maximum attraction quantity may result in falling-off of the load from the lifting magnet due to the insufficient attraction quantity. Therefore, the conveyance work is generally not started until the quantity reaches the maximum attraction quantity.

However, a conventional magnet working machine has not been intended for notifying an operator that the attraction quantity reaches the maximum attraction quantity when the attraction quantity reaches the maximum attraction quantity. Hence, the machine has had a problem of deterioration of work efficiency caused by a delay in start of the conveyance work attributed to hesitation of an operator as to whether to start the conveyance work.

In Patent Literature 1, the warning sound is issued when the horizontal position of the lifting magnet is away from the machine main body in the work, but is not issued when the attraction quantity reaches the maximum attraction quantity at the start of the excitation. In this respect, Patent Literature 1 fails to solve the aforementioned problem.

CITATION LIST

Patent Literature

Patent Literature 1: Japanese Unexamined Patent Publication No. 2011-68422

SUMMARY OF INVENTION

An object of the present invention is to provide a notification system which can increase work efficiency of a magnet working machine at a start of excitation.

A notification system according to an aspect of the present invention is a notification system which notifies a state of a lifting magnet attached to a magnet working machine and having an attraction quantity changing in accordance with an electric supply. The notification system includes: a notifier which notifies an operator of the state of the lifting magnet; a detector which detects at least one of a voltage, an electric current, and an electric power supplied for exciting the lifting magnet; a determination part which determines, based on detection data from the detector, whether the attraction quantity of the lifting magnet reaches a maximum attraction quantity after excitation of the lifting magnet is started; and a notification control part which causes the notifier to notify that the attraction quantity reaches the maximum attraction quantity when the determination part determines that the attraction quantity reaches the maximum attraction quantity.

This configuration can increase the work efficiency of the magnet working machine at the start of the excitation.

DESCRIPTION OF EMBODIMENTS

Hereinafter, embodiments of the present invention will be described with reference to the accompanying drawings. It should be noted that each of the following embodiments illustrates one specific example of the present invention, and does not delimit the protection scope of the present invention.

First Embodiment

Hereinafter, a notification system according to a first embodiment of the present invention will be described with reference to the accompanying drawings. In the description below, an example of an aspect where all the constituent elements of the notification system are mounted on a magnet working machine will be explained. However, it should be noted that this is a mere example, and thus not all the constituent elements of the notification system according to the present invention are necessarily mounted on the magnet working machine. For example, a part of the constituent elements of the notification system may be mounted on a remote operation device as shown in a second embodiment.

Figure 1:
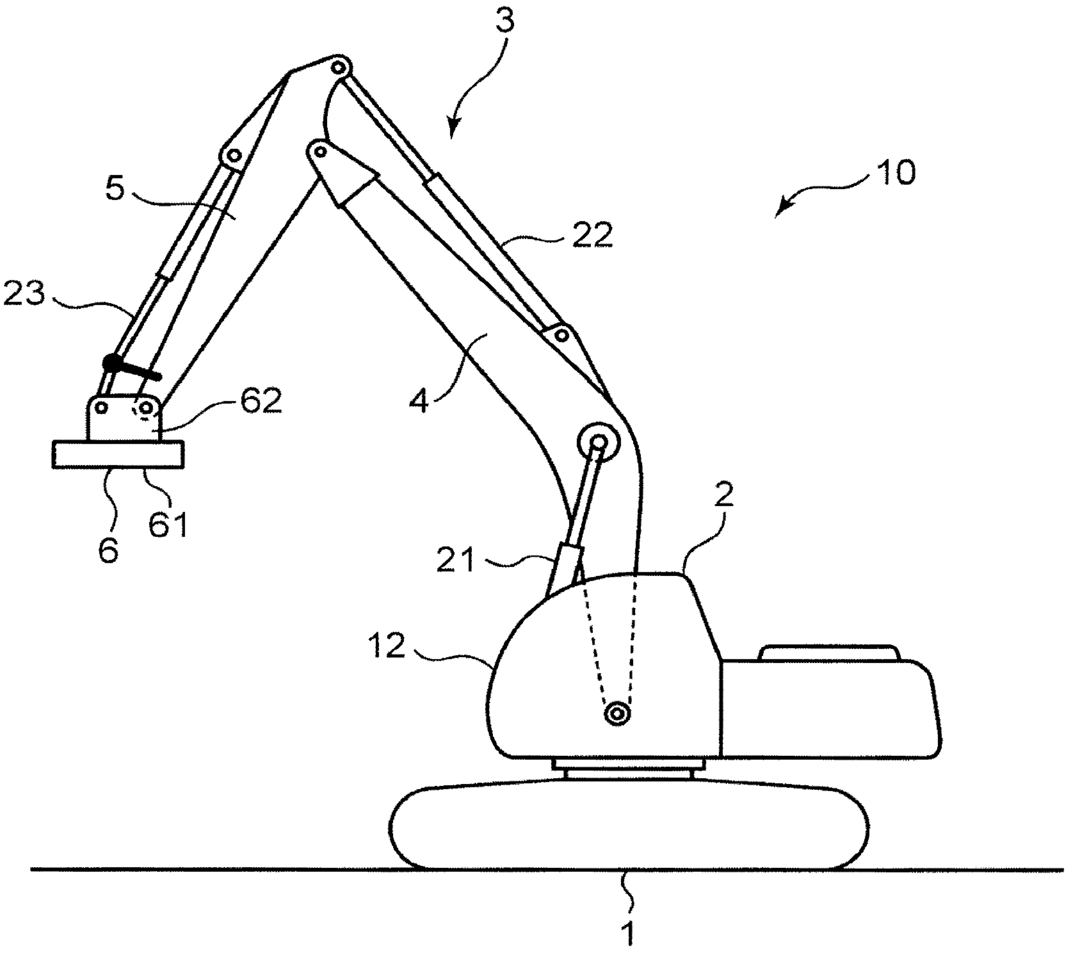
FIG. 1 is an external view showing an example of a magnet working machine on which a notification system according to a first embodiment is mounted.

FIG. 1 is an external view showing an example of a magnet working machine 10 on which a notification system according to the first embodiment is mounted. The magnet working machine 10 includes a lifting magnet 6 for attracting load like iron scrappers, and is called "lifmag machine" as well. The magnet working machine 10 is based on a hydraulic excavator, and thus is in the form of the hydraulic excavator including the lifting magnet 6 in place of the bucket.

The magnet working machine 10 includes a lower traveling body 1, an upper slewing body 2, and a working device 3. The lower traveling body 1 includes, for example, a crawler configured to be travelable on the ground. The upper slewing body 2 is mounted on an upper portion of the lower traveling body 1 slewably about a vertical axis with respect to the lower traveling body 1. The upper slewing body 2 includes an operator compartment 12 which allows an operator to get therein.

The working device 3 is configured to freely change its posture among, for example, three postures and used for performing a work of attracting iron scrappers or other load by the lifting magnet 6. The working device 3 includes a boom 4, an arm 5, and the lifting magnet 6. The boom 4 is tiltably attached to the upper slewing body 2. The arm 5 is attached to a distal end of the boom 4 rotatably about a horizontal axis. The lifting magnet 6 has a base 62 rotatably attached to a distal end of the arm 5, and an attraction surface 61 for holding the attracted load.

The magnet working machine 10 further includes a boom cylinder 21, an arm cylinder 22, and a magnet cylinder 23.

The boom cylinder 21 is located between the upper slewing body 2 and the boom 4. The boom cylinder 21 extends and contracts to raise and lower the boom 4.

The arm cylinder 22 is located between the boom 4 and the arm 5. The arm cylinder 22 extends and contracts to rotate the arm 5.

The magnet cylinder 23 is located between the arm 5 and the lifting magnet 6. The magnet cylinder 23 extends and contracts to rotate the lifting magnet 6.

Figure 2:
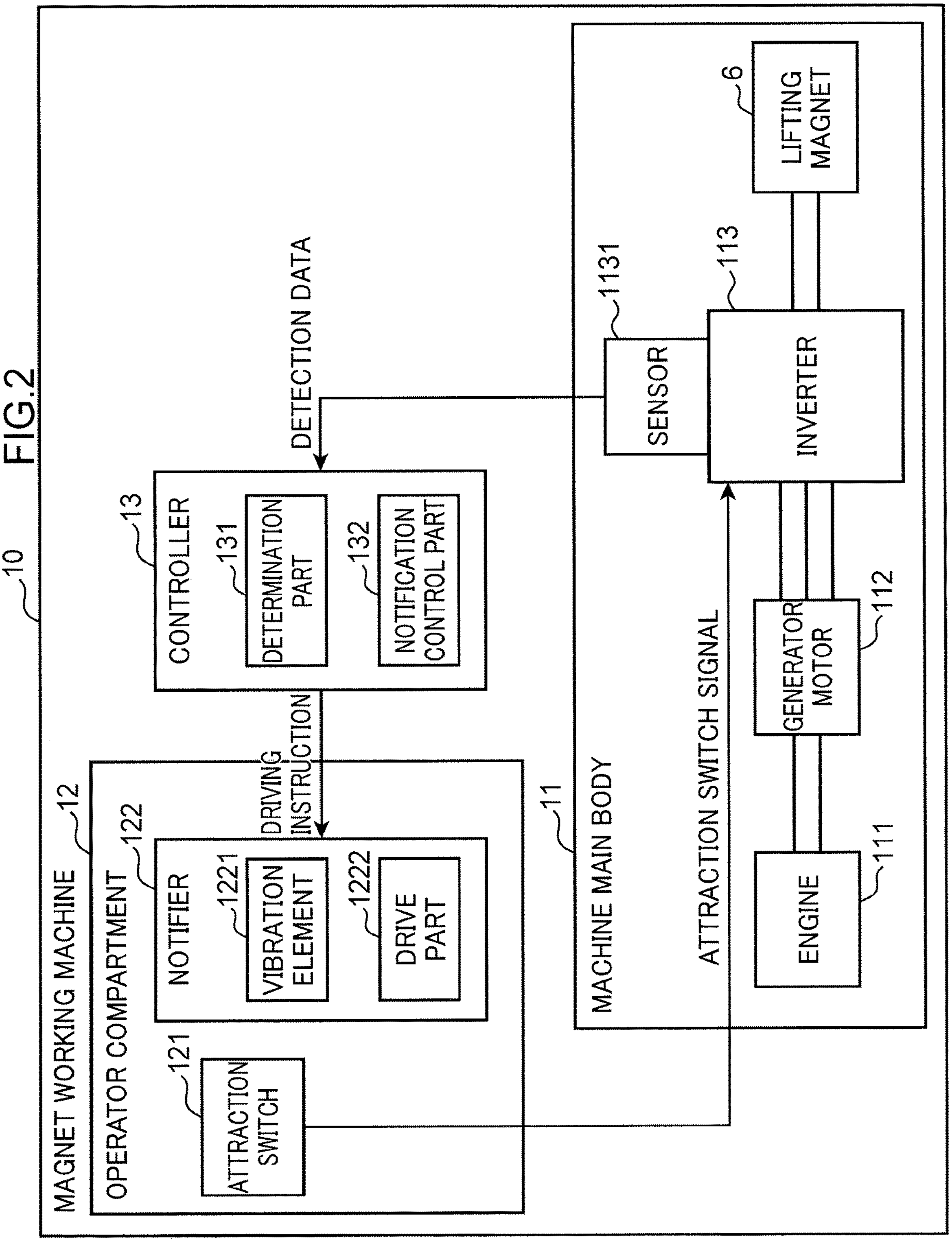
FIG. 2 is a block diagram showing an example of a configuration of the magnet working machine shown in FIG. 1.

FIG. 2 is a block diagram showing an example of a configuration of the magnet working machine 10 shown in FIG. 1. The magnet working machine 10 includes a machine main body 11, the operator compartment 12, and a controller 13. The machine main body 11 includes an engine 111, a generator motor 112, an inverter 113, and the lifting magnet 6. The engine 111 is a power source composed of, for example, a diesel engine for the magnet working machine 10. The engine 111 drives the generator motor 112. Additionally, the engine 111 drives a hydraulic pump for supplying a hydraulic fluid to each of the boom cylinder 21, the arm cylinder 22, and the magnet cylinder 23.

The generator motor 112 is driven with a motive power from the engine 111 and generates an electric power. The inverter 113 supplies the electric power generated by the generator motor 112 to the lifting magnet 6 when receiving an input of an ON-attraction switch signal from an attraction switch 121. Hereinafter, the electric power supplied by the lifting magnet 6 is referred to as a magnet electric power. In this manner, the lifting magnet 6 is excited to generate an attractive force. Conversely, the inverter 113 suspends the electric supply to the lifting magnet 6 when receiving an input of an OFF-attraction switch signal from the attraction switch 121. In this manner, the lifting magnet 6 is degaussed. At the degaussing, the magnet electric power is supplied to the generator motor 112 via the inverter 113 for regeneration of the electric power.

Specifically, the inverter 113 includes: a switching circuit connected to the generator motor 112; an excitation/degaussing shift circuit connected to the lifting magnet 6; an inverter control part which controls the switching circuit and the excitation/degaussing shift circuit; a positive generatrix and a negative generatrix each connecting the switching circuit and the excitation/degaussing shift circuit to each other; and a high-capacity capacitor provided between the positive generatrix and the negative generatrix.

The switching circuit is configured by, for example, a plurality of switching elements in combination for controlling transfer of the electric power between the generator motor 112 and the lifting magnet 6. The excitation/degaussing shift circuit is composed of, for example, a H-bridge circuit, and shifts the lifting magnet 6 between the excitation and degaussing under a control of the inverter control part. The inverter control part controls the switching circuit and the excitation/degaussing circuit in accordance with ON/OFF of the attraction switch 121. The high-capacity capacitor smooths a main circuit voltage indicating a voltage between the positive generatrix and the negative generatrix.

The inverter 113 further includes a sensor 1131 (which is an example of the detector). The sensor 1131 is composed of an electric power sensor provided on an electric supply route from the inverter 113 to the lifting magnet 6. The sensor 1131 detects the magnet electric power supplied from the generator motor 112 to the lifting magnet 6 via the inverter 113. Detection data indicating a value of the magnet electric power detected by the sensor 1131 is input to the controller 13.

The lifting magnet 6 is made of electromagnet, and is excited with the magnet electric power supplied from the inverter 113.

The controller 13 is formed of a microcontroller including a CPU, a ROM, and a RAM. The controller 13 includes a determination part 131 and a notification control part 132. The determination part 131 and the notification control part 132 may be established when the controller 13 executes a predetermined program, or may be established in the form of a dedicated hardware circuit.

The determination part 131 performs, based on detection data input from the sensor 1131, calculations of the attraction quantity of the lifting magnet 6 one after another, after the excitation of the lifting magnet 6 is started, and determines whether the attraction quantity obtained in each calculation reaches the maximum attraction quantity. Here, a value of the maximum attraction quantity is stored in a memory of the controller 13 in advance. The value of the maximum attraction quantity stored in the memory is updatable in a state where the magnet working machine 10 performs no work. In this case, the determination part 131 is to determine whether the attraction quantity reaches the maximum attraction quantity by using the updated maximum attraction quantity.

Figure 3:
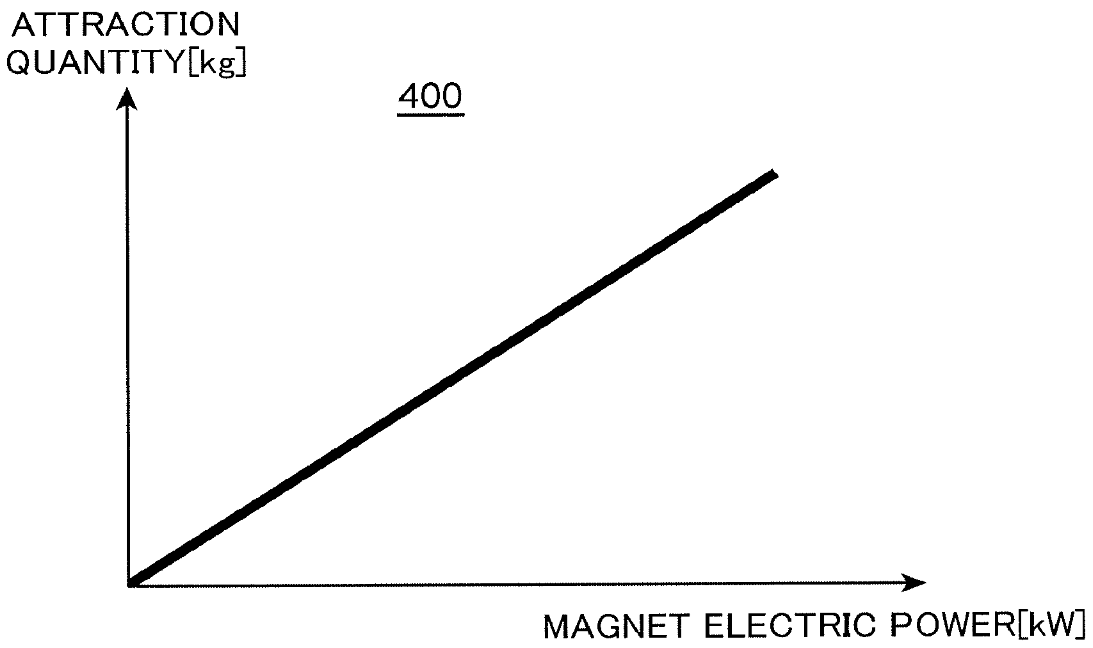
FIG. 3 is a graph showing an example of an attraction characteristic of a lifting magnet for use in a calculation of an attraction quantity by a determination part.

FIG. 3 is a graph showing an example of an attraction characteristic 400 of the lifting magnet 6 for use in each calculation of the attraction quantity by the determination part 131. The attraction characteristic 400 is stored in the memory of the controller 13 in advance. The attraction characteristic 400 represents a relation between the magnet electric power and the attraction quantity of the lifting magnet 6. The attraction quantity represents a weight of the load attractable by the lifting magnet 6 and corresponding to the magnet electric power. Here, a unit of the attraction quantity is, for example, "kg". Besides, a unit of the magnet electric power is, for example, "kW". The attraction characteristic 400 has a feature that the attraction quantity gradually increases as the magnetically electric power increases.

When the excitation is started, the determination part 131 may perform the calculations of the attraction quantity of the lifting magnet 6 one after another by acquiring the detection data of the magnet electric power from the sensor 1131 in a predetermined sampling period and specifying the attraction quantity corresponding to the magnet electric power indicated by the detection data acquired with reference to the attraction characteristic 400.

The notification control part 132 causes a notifier 122 to notify the attraction quantity obtained in each of the calculations performed by the determination part 131 one after another. Specifically, the notification control part 132 inputs, to a drive part 1222, a drive instruction of driving a vibration element 1221 at vibration intensity corresponding to the attraction quantity. For instance, at least one of the vibration frequency and the amplitude of the vibration element 1221 is adoptable as the vibration intensity. Here, the notification control part 132 is defined to gradually increase the vibration intensity as the attraction quantity increases. However, this definition is a mere example, and hence, the notification control part 132 may gradually reduce the vibration intensity as the attraction quantity increases. Alternatively, the notification control part 132 may increase one of the vibration frequency and the amplitude, and decrease the other as the attraction quantity increases.

The notification control part 132 then inputs, to the drive part 1222, a drive instruction of vibrating the vibration element 1221 in a vibration pattern explicitly indicating that the attraction quantity reaches the maximum attraction quantity when the determination part 131 determines that the attraction quantity reaches the maximum attraction quantity. Examples of the vibration pattern explicitly indicating that the attraction quantity reaches the maximum attraction quantity include a vibration pattern of giving a click feeling to the operator. A vibration pattern of vibrating the vibration element 1221 in a pulse shape once or a plurality of times is adoptable as the vibration pattern of giving the click feeling.

The operator compartment 12 includes the attraction switch 121 and the notifier 122. The attraction switch 121 is turned on and off by the operator. The attraction switch 121 inputs, for example, a high-level attraction switch signal to the inverter 113 when being turned on. The attraction switch 121 inputs, for example, a low-level attraction switch signal to the inverter when being turned off. The attraction switch 121 is composed of, for example, a button-type switch. The attraction switch 121 turns on the attraction switch signal when being pressed by the operator in an off-state. The attraction switch 121 turns off the attraction switch signal when being pressed by the operator in an on-state. The attraction switch 121 may be formed of a physical button or a GUI (Graphical User Interface) button displayed on a touch screen-type display provided in the operator compartment 12.

The notifier 122 includes the vibration element 1221 and the drive part 1222. The vibration element 1221 is arranged at a manipulation member provided in the operator compartment 12 for operating the magnet working machine 10. Examples of the manipulation lever include a manipulation member for manipulating at least one of the boom 4, the arm 5, the lifting magnet 6, the upper clewing body 2, and the lower traveling body 1. In this case, the vibration element 1221 is arranged in a place, e.g., inside the manipulation lever, suitably for transmitting the vibration to the operator. The vibration element 1221 is formed of, for example, a linear vibrator or a piezoelectric element.

The drive part 1222 drives the vibration element 1221 in accordance with a drive instruction input from the notification control part 132. The drive part 1222 includes, for example, an oscillation circuit having an oscillation frequency and an amplitude at least one of which is changeable in accordance with the input drive instruction. The oscillation circuit causes the vibration element 1221 to vibrate by supplying a drive current to the vibration element 1221.

Figures 4A, 4B, 4C, 4D:
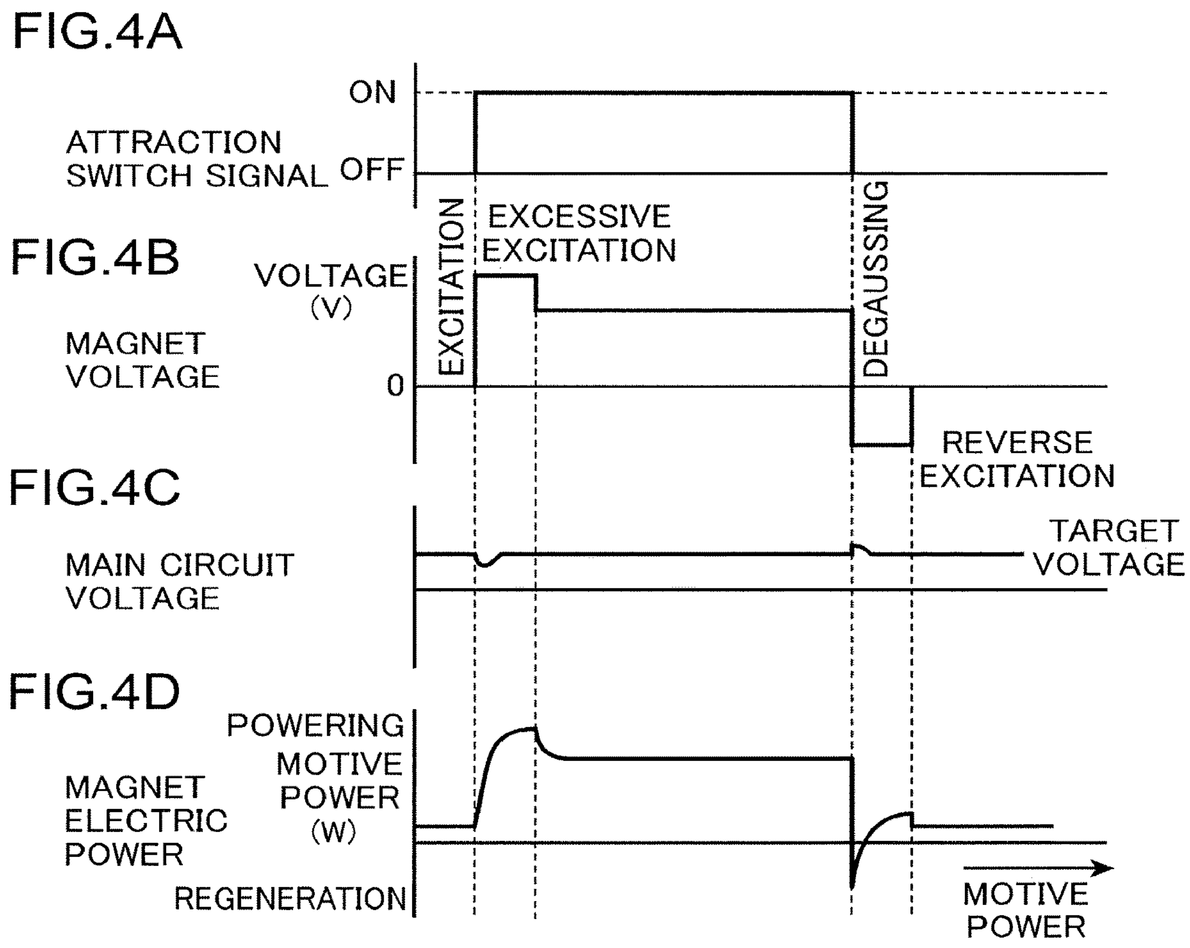
FIG. 4 is a time chart showing an example of an operation of the magnet working machine from "ON" to "Off" of an attraction switch.

FIG. 4 is a time chart showing an example of an operation of the magnet working machine 10 in a period from "ON" to "OFF" of the attraction switch 121. FIG. 4A shows an attraction switch signal, FIG. 4B shows a magnet voltage supplied to the lifting magnet 6, FIG. 4C shows a main circuit voltage, and FIG. 4D shows a magnet electric power supplied to the lifting magnet 6.

When the attraction switch signal is turned on as shown in FIG. 4A, a magnet voltage set to an excessive excitation voltage which is higher than a steady voltage as shown in FIG. 4B is supplied to the lifting magnet 6. Accordingly, as shown in FIG. 4C, the main circuit voltage once decreases from a target voltage, and thereafter restores the target voltage. Moreover, as shown in FIG. 4D, the magnet electric power gradually increases in an upward protrusive curve. When the magnet electric power reaches a peak, the magnet voltage is set to the steady voltage. Thereafter, the magnet voltage is maintained at the steady voltage until the attraction switch signal is turned off. When the magnet voltage is set to the steady voltage, the magnet electric power decreases to a steady electric power accordingly. Then, the magnet electric power is maintained at the steady electric power until the attraction switch signal is turned off. The magnet voltage is set to the excessive excitation voltage with an aim of causing the lifting magnet 6 to generate an enough attractive force to attract the load after the attraction is started.

When the attraction switch signal is turned off, the magnet voltage is set to a reverse excitation voltage which is a negative voltage for a given period, and the lifting magnet 6 is degaussed. Accordingly, the main circuit voltage once increases from the target voltage, and thereafter restores the target voltage as shown in FIG. 4C. Moreover, the magnet electric power rapidly decreases in a negative direction, and thereafter gently increases in an upward arch-like curve until the reverse excitation voltage reaches zero as shown in FIG. 4D. When the reverse excitation voltage reaches zero, the magnet electric power restores a previous electric power which is obtained before the attraction switch signal is turned on. The magnet voltage is set to the reverse excitation voltage with an aim of causing the lifting magnet 6 to generate a demagnetizing field by allowing the electric current to flow in a reverse direction for releasing the load.

Next, notification by the notifier 122 will be described with reference to the time chart shown in FIG. 4. When the excitation is started, the vibration intensity of the vibration element 1221 gradually increases as the magnet electric power increases. In this manner, the operator can proceed with the attraction work while estimating, based on the vibration intensity, a time required to reach the maximum attraction quantity. When the magnet electric power reaches a peak and the attraction quantity of the lifting magnet 6 reaches the maximum attraction quantity, the vibration element 1221 is vibrated in the pulse shape to notify the operator that the attraction quantity reaches the maximum attraction quantity. Therefore, the operator can proceed to a work subsequent to the attraction work after confirmation of the maximum attraction quantity. Examples of the subsequent work include a conveyance work of conveying the load attracted by slewing the upper slewing body 2 to another place.

Figure 5:
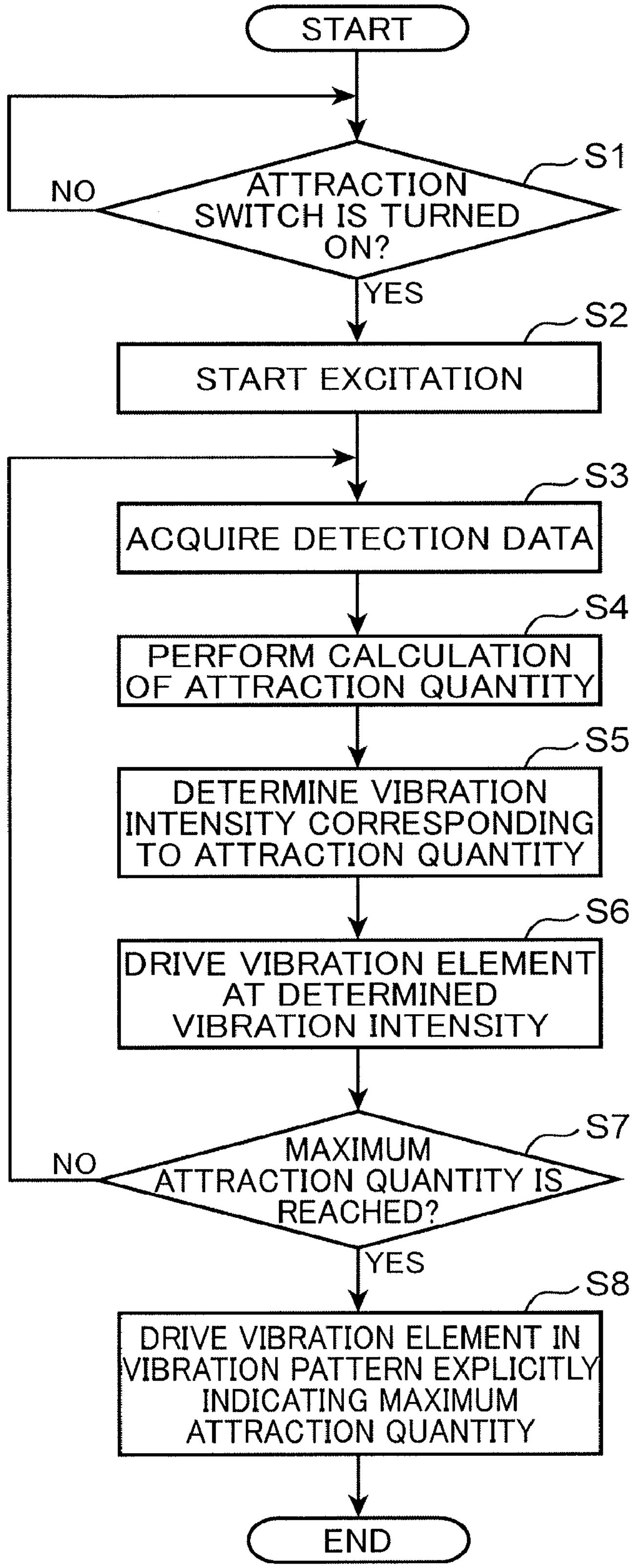
FIG. 5 is a flowchart showing an example of an operation of the magnet working machine in the first embodiment.

Next, an operation of the magnet working machine 10 will be described. FIG. 5 is a flowchart showing an example of an operation of the magnet working machine 10 in the first embodiment. In step S1, the attraction switch 121 receives a manipulation of turning on the attraction switch from the operator (YES in step S1). Hence, an ON-attraction switch signal is input from the attraction switch 121 to the inverter 113. Conversely, when the attraction switch 121 receives no manipulation of turning on the attraction switch (NO in step S1), the process is on standby.

In step S2, the inverter 113 supplies a magnet electric power to the lifting magnet 6 and starts excitation. In step S3, the determination part 131 acquires detection data detected by the sensor 1131. In step S4, the determination part 131 performs a calculation of an attraction quantity corresponding to the magnet electric power indicated by the detection data with reference to the attraction characteristic 400.

In step S5, the notification control part 132 determines vibration intensity of the vibration element 1221 corresponding to the attraction quantity obtained in the calculation in step S3. Then, the drive part 1222 receives an input of a drive instruction corresponding to the vibration intensity. In step S6, the drive part 1222 drives the vibration element 1221 at the vibration intensity determined in step S5. In this manner, a current attraction quantity is notified to the operator through a sense of touch.

In step S7, the determination part 131 determines whether the attraction quantity obtained in the calculation in step S4 reaches the maximum attraction quantity. When the attraction quantity reaches the maximum attraction quantity (YES in step S7), the notification control part 132 inputs, to the drive part 1222, a drive instruction of vibrating the vibration element 1221 in the vibration pattern explicitly indicating that the attraction quantity reaches the maximum attraction quantity (step S8). In this manner, the operator can recognize that the attraction quantity reaches the maximum attraction quantity through the sense of touch. Conversely, when the attraction quantity does not reach the maximum attraction quantity (No in step S7), the flow returns to step S3 to continue acquiring the detection data.

According to the embodiment, it is determined, based on the detection data detected by the sensor 1131, whether the attraction quantity of the lifting magnet 6 reaches the maximum attraction quantity after the excitation of the lifting magnet 6 is started. When the attraction quantity reaches the maximum attraction quantity, this is notified to the operator. In response to the notification, the operator can promptly start a work, such as the conveyance work, to be performed subsequently to the attraction work when the attraction quantity reaches the maximum attraction quantity, and consequently, the work efficiency at the start of the excitation can be increased.

Second Embodiment

Figure 6:
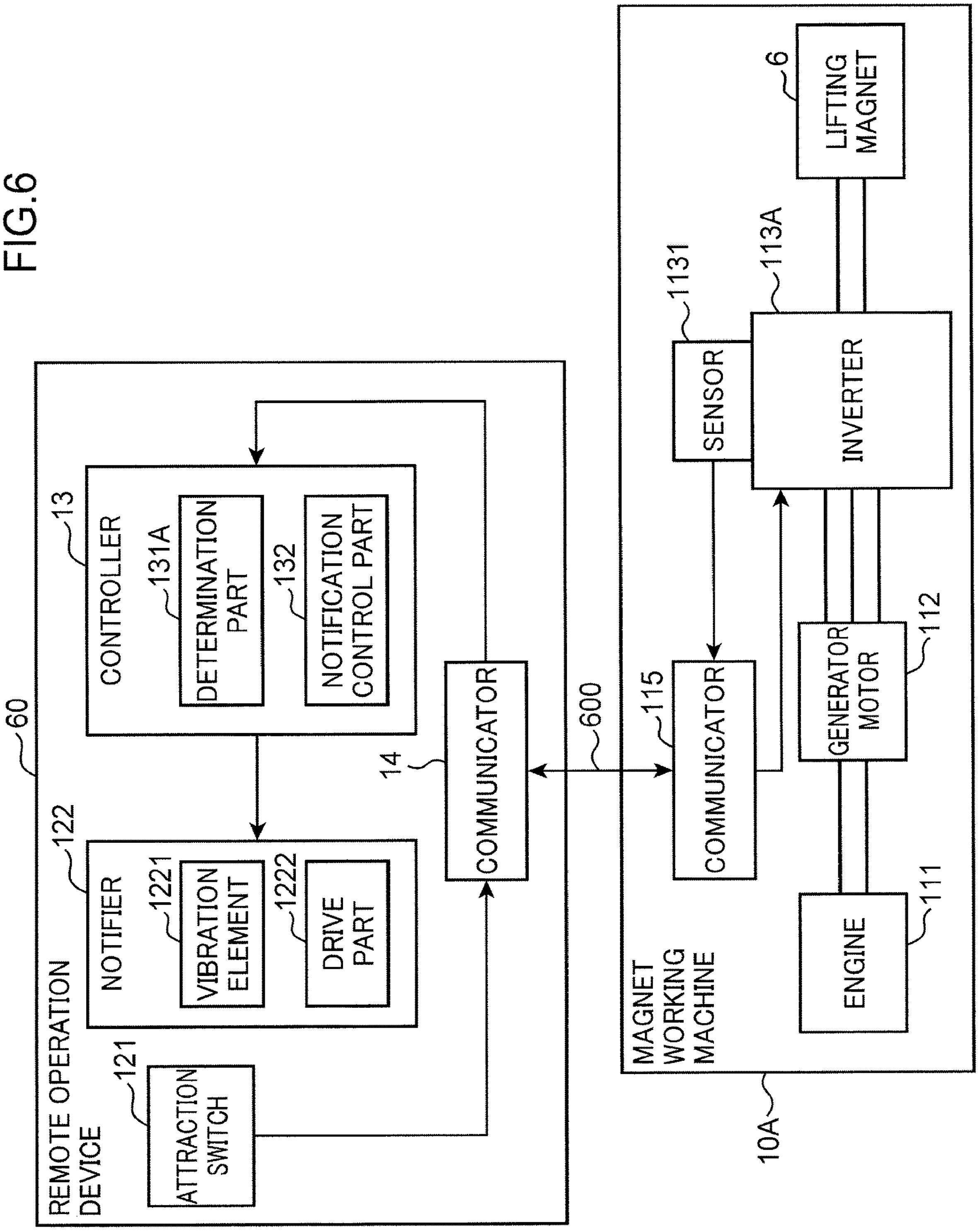
FIG. 6 is a block diagram showing an example of a configuration of a notification system according to a second embodiment.

FIG. 6 is a block diagram showing an example of a configuration of a notification system according to the second embodiment. The second embodiment represents the configuration where at least a notifier 122 is mounted on a remote operation device 60. The remote operation device 60 further includes a communicator 14 in addition to the attraction switch 121, the notifier 122, and the controller 13 each shown in FIG. 2.

The remote operation device 60 is a device for remotely operating a magnet working machine 10A. The remote operation device 60 includes a manipulation lever and an operator seat like those provided in an operator compartment of the magnet working machine 10A. Moreover, the remote operation device 60 includes a display which displays an image around the magnet working machine 10A as captured by a camera included in the magnet working machine 10A. The operator of the remote operation device 60 can operate the remote operation device 60 from a remote location by manipulating the manipulation lever while sitting on the operator seat and seeing the image displayed on the display.

The communicator 14 includes a communication circuit for causing the remote operation device 60 to communicate with the magnet working machine 10A via a communication channel 600. The communicator 14 transmits an attraction switch signal indicating ON/OFF of the attraction switch 121 to a communicator 115 via the communication channel 600. The communicator 14 transmits a signal indicating a manipulation amount of the manipulation lever to the communicator 115 via the communication channel 600. The communicator 14 receives detection data detected by a sensor 1131 and transmitted from the communicator 115 via the communication channel 600. The communicator 14 further receives an image signal transmitted from the communicator 115 via the communication channel 600.

A determination part 131A basically has the same operability as the determination part 131 shown in FIG. 2, but differs from the determination part 131 in performing calculations of an attraction quantity one after another by using the detection data received by the communicator 14.

As the communication channel 600, a public network including an interne communication network and a mobile phone communication network may be adopted, or a local area network, such as a wireless LAN, a wired LAN, and a specified low power radio may be adopted.

The magnet working machine 10A further includes the communicator 115 in addition to the constituent elements included in the machine main body 11 shown in FIG. 2. The communicator 115 includes a communication circuit for causing the magnet working machine 10A to communicate with the remote operation device 60. The communicator 115 receives the signal indicating the manipulation amount transmitted from the communicator 14 via the communication channel 600. The communicator 115 further transmits the detection data detected by the sensor 1131 to the communicator 14 via the communication channel 600.

An inverter 113A basically has the same operability as the inverter 113 shown in FIG. 2, but differs from the inverter 113 in exciting and degaussing a lifting magnet 6 in response to the attraction switch signal received by the communicator 115.

Next, an operation of the notification system according to the second embodiment will be described. When the attraction switch 121 is turned on, an ON-indicating attraction switch signal is sent from the communicator 14 to the magnet working machine 10A. When the communicator 115 receives the ON-indicating attraction switch signal, the inverter 113A starts excitation of the lifting magnet 6. Thereafter, the communicator 115 performs transmissions of the detection data detected by the sensor 1131 to the remote operation device 60 one after another.

The determination part 131A performs a calculation of an attraction quantity corresponding to a magnet electric power indicated by the detection data received by the communicator 14 with reference to an attraction characteristic 400, and inputs, to a drive part 1222, a drive instruction of driving a vibration element 1221 at vibration intensity corresponding to the attraction quantity obtained in the calculation. In this manner, the vibration element 1221 drives at the vibration intensity corresponding to the attraction quantity.

When the attraction quantity obtained in the calculation from the magnet electric power indicated by the detection data received by the communicator 14 reaches a maximum attraction quantity, a notification control part 132 inputs, to the drive part 1222, a drive instruction of driving the vibration element 1221 in a vibration pattern explicitly indicating that the attraction quantity reaches the maximum attraction quantity. In response to the input, the vibration element 1221 vibrates in the drive pattern explicitly indicating that the attraction quantity reaches the maximum attraction quantity. As a result, the operator can confirm that the attraction quantity reaches the maximum attraction quantity through the sense of touch.

Conclusively, the notification system according to the embodiment can notify the operator of the remote operation device 60 to remotely operate the magnet working machine 10A of a current attraction quantity and that the attraction quantity reaches the maximum attraction quantity. This results in permitting the operator to perform the attraction work through the remote operation while estimating a time required to reach the maximum attraction quantity. Additionally, the operator can confirm from the vibration pattern that the attraction quantity reaches the maximum attraction quantity, promptly proceed to the subsequent work from the attraction work, and thus efficiently perform the remote operation.

The present invention can adopt modifications described below.

(1) Although the notification about the maximum attraction quantity is given with the vibration in the embodiment, the present invention is not limited thereto, and the notification about the maximum attraction quantity may be given with a sound. In this case, the notifier 122 shown in FIG. 2 may include an audio device. Specifically, the audio device has a speaker located in the operator compartment 12 and a drive part which drives the speaker.

The notification control part 132 inputs, to the drive part, a drive instruction of causing the speaker to output a sound having sound intensity corresponding to an attraction quantity obtained in each of calculations performed by the determination part 131 one after another. Examples of the sound intensity include at least one of an amplitude and a frequency of the sound output from the speaker. The notification control part 132 may increase the sound intensity of the sound output from the speaker as the attraction quantity increases. However, this is a mere example, and the notification control part 132 may reduce the sound intensity of the sound output from the speaker as the attraction quantity increases. Alternatively, the notification control part 132 may increase one of the frequency and the amplitude of the sound output from the speaker and decrease the other as the attraction quantity increases.

The notification control part 132 then inputs, to the drive part, a drive instruction of causing the speaker to output a sound pattern explicitly indicating that the attraction quantity reaches the maximum attraction quantity when the determination part 131 determines that the attraction quantity reaches the maximum attraction quantity. Examples of the sound pattern explicitly indicating that the attraction quantity reaches the maximum attraction quantity includes a pulse sound for intermittently making a sound component once or a plurality of times.

The drive part generates a sound signal in accordance with the drive instruction and input the generated sound signal to the speaker. Accordingly, the speaker outputs the sound having the sound intensity which gradually increases after the excitation is started. Furthermore, the speaker outputs the sound pattern explicitly indicating that the attraction quantity reaches the maximum attraction quantity when the attraction quantity reaches the maximum attraction quantity. Consequently, a current attraction quantity and the fact that the attraction quantity reaches the maximum attraction quantity are notified to the operator through a sense of hearing.

(2) Although the notification about the maximum attraction quantity is given with the vibration in the embodiment, the present invention is not limited thereto, and the notification about the maximum attraction quantity may be given through a motion seat. In this case, the notifier 122 includes a motion seat located in the operator compartment 12 at a changeable tilt angle. The motion seat is configured to be rotatable in, for example, three directions of a roll direction, a pitch direction, and a yaw direction. The motion seat includes a motor unit for changing the tilt angle of the motion seat. The motor unit includes three motors respectively for the roll direction, the pitch direction, and the yaw direction. Here, the motion seat is described as rotatable in the three directions of the roll direction, the pitch direction, and the yaw direction, but this is a mere example, and thus the motion seat may be rotatable in at least one of or two or more of the roll direction, the pitch direction, and the yaw direction.

The notification control part 132 inputs, to the motor, a drive instruction of tilting the motion seat in a tilt pattern corresponding to the attraction quantity obtained in each of calculations performed by the determination part 131 one after another. Adoptable tilt patterns include a tilt pattern of increasing the tilt angle of the motion seat in any one of the roll direction, the pitch direction, and the yaw direction as the attraction quantity increases. Alternatively, another adoptable tilt pattern is swaying the motion seat to increase the amplitude in any one of the roll direction, the pitch direction, and the yaw direction as the attraction quantity increases.

The notification control part 132 inputs, to the motor, a drive instruction of tilting the motion seat in a tilt pattern explicitly indicating that the attraction quantity reaches the maximum attraction quantity when the determination part 131 determines that the attraction quantity reaches the maximum attraction quantity. Examples of adoptable tilt patterns each explicitly indicating that attraction quantity reaches the maximum attraction quantity include a tilt pattern of swaying the motion seat in any one of the roll direction, the pitch direction, and the yaw direction once or a plurality of times. In this case, a direction in which the motion seat is tilted until the attraction quantity reaches the maximum attraction quantity may differ from the direction in which the motion seat is tilted when the attraction quantity reaches the maximum attraction quantity.

An example of an operation of the motion seat will be described below. When the excitation is started, the tilt angle of the motion seat in the pitch direction is gradually increased so that the motion seat leans frontward in accordance with the attraction quantity. Then, when the attraction quantity reaches the maximum attraction quantity, the motion seat sways in the roll direction a predetermined number of times. Consequently, a current attraction quantity and the fact that the attraction quantity reaches the maximum attraction quantity are notified to the operator through the movement of the motion seat.

(3) Although the notification about the maximum attraction quantity is given with the vibration in the embodiment, the present invention is not limited thereto, and the notification about the maximum attraction quantity may be given with an image displayed on a display device. In this case, the notifier 122 shown in FIG. 2 may include the display device.

The notification control part 132 inputs, to the display device, a drive instruction of causing the display device to display a value of the attraction quantity obtained in each of calculations performed by the determination part 131 one after another. A way of displaying an indicator and/or a way of displaying a value of the attraction quantity itself is adoptable to display the attraction quantity.

When the attraction quantity reaches the maximum attraction quantity, the notification control part 132 inputs, to the display device, a drive instruction of causing the display device to display an image explicitly indicating that the attraction quantity reaches the maximum attraction quantity. A way of showing a message and/or changing a color of the indicator from a first color serving as default to a second color is adoptable to display the image explicitly indicating that the attraction quantity reaches the maximum attraction quantity. In this case, the message may be deleted from a display screen in a lapse of a predetermined period after the attraction quantity reaches the maximum attraction quantity. Moreover, the color of the indicator may be changed back to the first color from the second color in the lapse of the predetermined period after the attraction quantity reaches the maximum attraction quantity. Consequently, a current attraction quantity and the fact that the attraction quantity reaches the maximum attraction quantity are notified to the operator through a sense of sight.

(4) Each of modifications (1) to (3) described above may be applied to the notification system described in the second embodiment. Additionally, the present invention may be configured in any combination of at least two ways among the way of notification based on the vibration represented in the first embodiment, the way of notification based on the sound represented in modification (1), the way of notification based on the movement of the motion seat represented in modification (2), and the way of notification based on the image represented in modification (3).

(5) Although the generator motor 112 is driven by directly receiving a motive power of the engine 111 in the machine main body 11 shown in FIG. 2 and the magnet working machine 10A shown in FIG. 6, the present invention is not limited thereto. For instance, the generator motor 112 may be driven by receiving a motive power from a hydraulic motor. In this case, the machine main body 11 or the magnet working machine 10A may further include a hydraulic pump driven with a motive power of the engine 111, and a hydraulic motor driven with the hydraulic fluid supplied from the hydraulic pump.

(6) Although the sensor 1131 shown in FIG. 2 and FIG. 6 is an electric power sensor, the present invention is not limited thereto. The sensor may be a voltage sensor which detects a magnet voltage supplied from the inverter 113, 113A to the lifting magnet 6 and/or an electric current sensor which detects a magnet electric current supplied from the inverter 113, 113A to the lifting magnet 6. In this case, the determination part 131, 131A may calculate the magnet electric power by using detection data output from the voltage sensor and detection data output from the electric current sensor, and perform a calculation of an attraction quantity from the magnet electric power.

When the lifting magnet 6 is driven in a state where the attraction quantity is calculatable solely from the magnet voltage or the magnet electric current, the determination part 131, 131A may perform the calculation of the attraction quantity solely from the magnet electric current detected by the electric current sensor or from the magnet voltage detected by the voltage sensor.

(7) The controller 13 may be mounted on the magnet working machine 10A in the second embodiment.

SUMMARY OF EMBODIMENTS

A notification system according to an aspect of the present invention is a notification system which notifies a state of a lifting magnet attached to a magnet working machine and having an attraction quantity changing in accordance with an electric supply. The notification system includes: a notifier which notifies an operator of the state of the lifting magnet; a detector which detects at least one of a voltage, an electric current, and an electric power supplied for exciting the lifting magnet; a determination part which determines, based on detection data from the detector, whether the attraction quantity of the lifting magnet reaches a maximum attraction quantity after excitation of the lifting magnet is started; and a notification control part which causes the notifier to notify that the attraction quantity reaches the maximum attraction quantity when the determination part determines that the attraction quantity reaches the maximum attraction quantity.

According to this configuration, it is determined, based on the detection data detected by the detector, whether the attraction quantity of the lifting magnet reaches the maximum attraction quantity after the excitation of the lifting magnet is started. When the attraction quantity reaches the maximum attraction quantity, this is notified to the operator. In response to the notification, the operator can promptly start a work, such as the conveyance work, to be performed subsequently to the attraction work by the magnet working machine when the attraction quantity reaches the maximum attraction quantity, and consequently, the work efficiency at the start of the excitation can be increased.

In the notification system, preferably, the determination part performs, based on the detection data, calculations of the attraction quantity one after another, after the excitation is started, and the notification control part causes the notifier to notify the attraction quantity obtained in each of the calculations performed by the determination part one after another.

According to this configuration, the calculations of the attraction quantity are performed one after another and the attraction quantity is notified, after the excitation is started. Accordingly, the operator can estimate a quantity required to reach the maximum attraction quantity.

In the notification system, it is preferable that the notifier preferably include a vibration element arranged at a manipulation member for manipulating the magnet working machine, and that the notification control part cause the vibration element to vibrate in a predetermined vibration pattern to notify that the attraction quantity reaches the maximum attraction quantity.

This configuration succeeds in notifying the operator that the attraction quantity reaches the maximum attraction quantity through the sense of touch. Moreover, the fact that the attraction quantity reaches the maximum attraction quantity can be notified owing to gripping of the manipulation member. The notification can further increase the work efficiency without hindering the vision of the operator engaged in a work.

In the notification system, it is preferable that the notifier include an audio device, and that the notification control part cause the audio device to output a predetermined sound to notify that the attraction quantity reaches the maximum attraction quantity.

This configuration succeeds in notifying the operator that the attraction quantity reaches the maximum attraction quantity through the sense of hearing. The notification can further increase the work efficiency without hindering the vision of the operator engaged in a work.

In the notification system, it is preferable that the notifier include a motion seat, and that the notification control part cause the motion seat to move in a predetermined motion pattern to notify that the attraction quantity reaches the maximum attraction quantity.

This configuration succeeds in notifying the operator that the attraction quantity reaches the maximum attraction quantity through the movement of the motion seat. This notification can further increase the work efficiency without hindering the vision of the operator engaged in a work.

In the notification system, the notifier is preferably located in an operator compartment of the magnet working machine.

This configuration achieves notification to the operator operating in the operator compartment of the magnet working machine.

In the notification system, the notifier is preferably located at a remote operation device for remotely operating the magnet working machine.

This configuration notifies the operator of the remote operation device to operate the magnet working machine that the attraction quantity reaches the maximum attraction quantity, and consequently can increase the efficiency of the remote operation device.

The invention claimed is:

1. A notification system which notifies a state of a lifting magnet attached to a magnet working machine and having an attraction quantity changing in accordance with an electric supply, the notification system comprising:

- a notifier which notifies an operator of the state of the lifting magnet;
- a detector which detects at least one of a voltage, an electric current, and an electric power supplied for exciting the lifting magnet;
- a determination part which determines, based on detection data from the detector, whether the attraction quantity of the lifting magnet reaches a maximum attraction quantity after excitation of the lifting magnet is started; and
- a notification control part which causes the notifier to notify that the attraction quantity reaches the maximum attraction quantity when the determination part determines that the attraction quantity reaches the maximum attraction quantity.

2. The notification system according to claim 1, wherein

- the determination part performs, based on the detection data, calculations of the attraction quantity one after another, after the excitation is started, and
- the notification control part causes the notifier to notify the attraction quantity obtained in each of the calculations performed by the determination part one after another.

3. The notification system according to claim 1 or 2, wherein

- the notifier includes a vibration element arranged at a manipulation member for manipulating the magnet working machine, and
- the notification control part causes the vibration element to vibrate in a predetermined vibration pattern to notify that the attraction quantity reaches the maximum attraction quantity.

4. The notification system according to claim 1 or 2, wherein

- the notifier includes an audio device, and
- the notification control part causes the audio device to output a predetermined sound to
- notify that the attraction quantity reaches the maximum attraction quantity.

5. The notification system according to claim 1 or 2, wherein

- the notifier includes a motion seat, and
- the notification control part causes the motion seat to move in a predetermined motion pattern to notify that the attraction quantity reaches the maximum attraction quantity.

6. The notification system according to any one of claims 1 to 5, wherein

- the notifier is located in an operator compartment of the magnet working machine.

7. The notification system according to any one of claims 1 to 5, wherein

- the notifier is located at a remote operation device for remotely operating the magnet working machine.

* * * * *